Feb. 26, 1929.
W. R. GODDARD ET AL
1,703,270
PENETRATION TESTER
Filed July 15, 1924
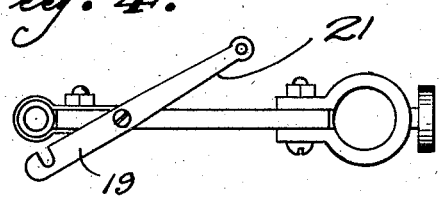
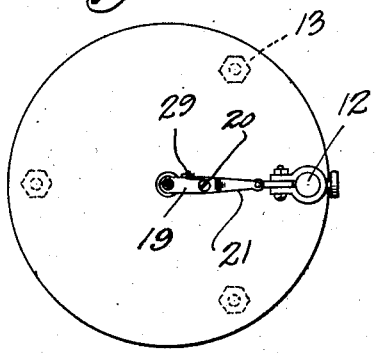
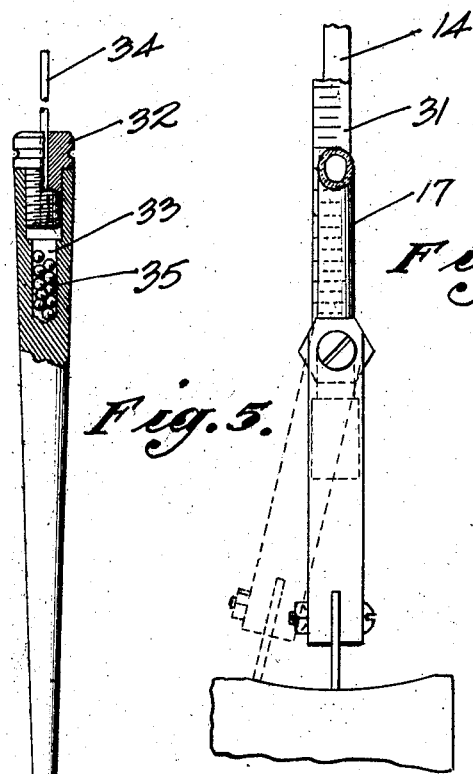
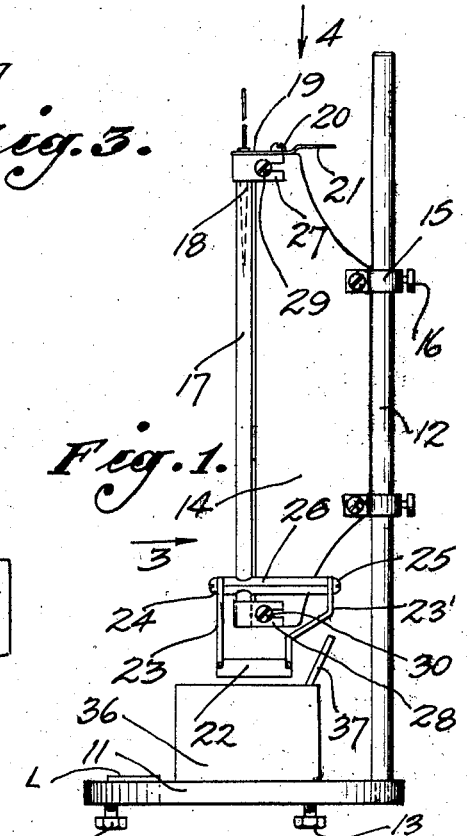
INVENTORS
WINFRED. R. GODDARD
CHARLES. K. HEWES.
BY,
Graham Harris
ATTORNEYS Patented Feb. 26, 1929.

1,703,270

UNITED STATES PATENT OFFICE.

WINFRED R. GODDARD AND CHARLES K. HEWES, OF LOS ANGELES, CALIFORNIA.

PENETRATION TESTER.

Application filed July 15, 1924. Serial No. 726,102.

Our present invention is an apparatus for determining the consistency, and optionally also the elastic properties of semi-solid or similar substances, by means of a penetrator falling from a predetermined elevation.

We are aware that various instruments are on the market employing the principle of a falling penetrator; but our instrument differs therefrom in several important respects; and it is adapted to test materials in original ungraduated and opaque containers varying in size.

In one known penetrator, a plunger of definite size and weight is permitted to fall from a definite elevation, producing an indentation that is subsequently measured. That instrument can be satisfactorily used only on solid bodies; whereas our instrument is especially suitable for use upon semisolid bodies.

Another known instrument is one that depends upon the penetration of a cone or needle during a definite period of time subsequent to its release at the surface of the substance under test. The initial adjustment of this instrument depends upon the reflection of an image; but many semi-solid substances (as also many solid substances) do not present a surface that will satisfactorily reflect the image of the penetrator; and this fact prevents an accurate initial adjustment of the penetrator at the surface thereof. We have found it advisable to drop a novel penetrator from an elevation, this elevation being accurately predetermined, as by a standardization of the parts of our instrument.

It is an especial object of our invention to provide an instrument simple in construction and operation and capable of use with a great variety of substances, including especially the mentioned semi-solid substances, which may vary in consistency from hard soaps, or the like, to very soft cup greases, or the like,—for the testing of all of which only a single penetrator is needed.

It is a further object of our invention to provide an instrument which, although relying upon the principle of penetration, requires but a few minutes for the completion of any test; and it is a merit of the device hereinafter described that it permits easy cleaning and easy replacement of parts. Our instrument is moreover such as to permit of a high degree of accuracy and reproducibility of results, observational errors being practically eliminated, and no exact determinations of time, as by means of a stop watch, being required.

Other objects of our invention will appear from the following description of a preferred embodiment thereof, taken in connection with the appended claims and the accompanying drawings, in which Fig. 1 is a general view showing our instrument in side elevation.

Fig. 2 is a top plan view of the same.

Fig. 3 is a detail view taken in the direction of the arrow 3 of Fig. 1 and showing a levelling or smoothing device, hereinafter referred to.

Fig. 4 is a similarly enlarged incomplete top plan view taken in the direction of the arrow 4 of Fig. 1, and showing certain features of supporting and releasing construction, hereinafter referred to.

Fig. 5 is a separate and further enlarged view of a preferred type of penetrator, as hereinafter described.

Referring to the details of that particular form of our invention chosen for purposes of illustration, 11 may be a comparatively heavy base supporting a perpendicular rod 12, the base being provided with levelling screws 13 of a familiar type, adapted to facilitate adjustment of the plate or base 11 to a horizontal position, (preferably with the aid of a level of known type, as suggested at L) the rod 12 being thereby rendered vertical. An adjustable support 14, shown as comprising a substantially vertical plate, may be adapted to slide upon the rod 12, as by means of guide rings 15, and may be held at any desired elevation by clamping means such as thumb screws 16.

As shown, the support 14 holds a guide 17, which may be a tube of glass or other suitable material, through which may fall the penetrator 18, this latter element being of any preferred construction adapted to be retained by means such as a slotted arm 19, shown as pivoted at 20 to the support 14 and as provided with releasing means in the form of a second arm 21.

At the lower end of the support 14, or its equivalent, we may provide a transversely movable device comprising a scraper 22, optionally to be used not only in the establishment of a predetermined distance between the penetrator, in its normal or elevated position, and a substance to be tested but also to smooth and perfect the surface of the same. This movable device may comprise arms 23, 23' movable upon pivots 24, 25 at the ends of a horizontal support 26, through which the guide and guard tube 17 may extend, the respective ends of the latter being shown as secured by slotted clips 27, 28, through which extend the screws 29, 30.

Either the tube 17 or the support 14 may be provided with a scale 31, such as a scale graduated in millimeters shown as visible through and protected by said tube, to facilitate ascertainment of the level to which the freely falling penetrator 18, or its equivalent, descends when released; and this penetrator, as well as the guide through which it may drop, is intended to be of a carefully standardized design and construction. For example, our penetrator may comprise a tapered body about one hundred millimeters in length and six millimeters in diameter at its larger end, diminishing to a diameter of one-half millimeter and provided at its smaller end with a conical point tapered to an inclination of thirty degrees relatively to the longitudinal axis thereof; and the total length of our penetrator, including a threaded and knurled plug or cap 32 adapted to close a chamber 33 therein, may be, for example, 104½ millimeters, exclusive of a wire 34, adapted to serve as a handling and pointing means extending above the top of the guide 17; and the total weight of our penetrator, which may be as low as 1 gram, but may more commonly be 10 grams, may be adjusted by the insertion of any required quantity of shot 35, or the like, disposed within the chamber 33. While we have found this penetrator highly satisfactory, we, of course, do not limit ourselves to any specific dimensions or to any specific weight; but the zero of our scale may naturally be so placed as to come opposite the top of the wire 34 in case of no penetration.

The execution of a test, with an instrument of the general character described, may be conducted substantially as follows. The material to be tested, (which may be in a container 36 of sufficient size, in which a thermometer 37 may be inserted; or which may be, in the case of harder substances, in the form of a slab of the material) may be placed upon the level base 11 at a standard or specified temperature; the scraper support may then be lowered until the surface of the material is contacted by the scraper blade; the thumb screws 16, or other clamping means, may then be tightened, and the surface of the material may be smoothed off. The penetrator, being then in its elevated or normal position on its support, may be released by means of the arm 21 and allowed to drop freely through the guide 17 into the sample. The consistency may then be ascertained by taking, with reasonable promptitude, the reading of the scale 31, on a level with the top of the penetrator wire 34.

By a continued observation of the penetrator during, for example, the following half minute, an indication of the elasticity is also obtainable, as represented by the amount that the penetrator rises. If the consistency of the substance tested is such that the penetrator slowly falls, the rate of its fall may also optionally be observed. The penetrator may be removed, for any necessary cleaning and for resetting, by merely loosening the thumb screws or their equivalent, and then raising the guide support.

Although we have herein described one complete embodiment of our invention, it will be understood that various features thereof might be independently employed and also that various modifications might be made by those skilled in the art, without the slightest departure from the spirit and scope of our invention, as the same is indicated above and in the following claims.

We claim as our invention:

1. A testing organization comprising: a supporting standard; a freely falling tapered and pointed body; releasable retaining means therefor; pivotally movable means for cutting and smoothing the surface of a substance to be tested at a definite distance from said penetrator releasable retaining means; and means mounted on said standard, supporting said retaining means and said surface smoothing means.

2. A penetration testing organization comprising: an adjustable supporting member; a transparent graduated tubular member mounted on said supporting member; a penetrating member adapted to fall freely through said tubular member; means mounted on said supporting member for releasably retaining said penetrating member; and a downwardly extending scraping blade, pivotally mounted on said supporting member.

3. A penetration testing organization comprising: an adjustable supporting member; a transparent graduated tubular member mounted on said supporting member; a tapered and pointed body provided with an upwardly extending handle and adapted to fall freely through said tubular member; releasable retaining means mounted on said supporting member and engageable with said handle; and a downwardly extending scraping blade pivotally mounted on said supporting member.

In testimony whereof, we have hereunto set our hands at Los Angeles, California, this 7 day of July, 1924.

WINFRED R. GODDARD.
CHARLES K. HEWES.